United States Patent
Tedaldi et al.

(10) Patent No.: US 12,526,685 B2
(45) Date of Patent: Jan. 13, 2026

(54) GENERATING LONG-TERM NETWORK CHANGES FROM SLA VIOLATIONS

(71) Applicant: Cisco Technology, Inc., San Jose, CA (US)

(72) Inventors: David Tedaldi, Zurich (CH); Jean-Philippe Vasseur, Saint Martin d'Uriage (FR); Grégory Mermoud, Venthône (CH); Pierre-André Savalle, Rueil-Malmaison (FR); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/381,343

(22) Filed: Jul. 21, 2021

(65) Prior Publication Data
US 2023/0027995 A1    Jan. 26, 2023

(51) Int. Cl.
*H04W 28/02*    (2009.01)
*H04L 41/5019*    (2022.01)

(52) U.S. Cl.
CPC ..... *H04W 28/0268* (2013.01); *H04L 41/5019* (2013.01)

(58) Field of Classification Search
None
See application file for complete search history.

(56) References Cited

U.S. PATENT DOCUMENTS

| | | | |
|---|---|---|---|
| 6,912,575 B1 | 6/2005 | Swift et al. | |
| 2005/0071450 A1 | 3/2005 | Allen et al. | |
| 2017/0250877 A1* | 8/2017 | Seyvet | H04L 41/5009 |
| 2019/0036813 A1* | 1/2019 | Shenoy | H04L 45/02 |
| 2020/0050494 A1* | 2/2020 | Bartfai-Walcott | G06F 9/5083 |
| 2020/0097879 A1 | 3/2020 | Venkata et al. | |
| 2020/0204460 A1* | 6/2020 | Schneider | H04L 43/10 |
| 2020/0287779 A1 | 9/2020 | Zafer et al. | |
| 2020/0382387 A1 | 12/2020 | Pasupathy et al. | |
| 2021/0067419 A1* | 3/2021 | Adam | H04L 41/0806 |
| 2022/0078127 A1* | 3/2022 | Tourrilhes | H04L 47/28 |
| 2022/0229707 A1* | 7/2022 | Lange | G06F 9/5088 |

* cited by examiner

*Primary Examiner* — Asad M Nawaz
*Assistant Examiner* — Najeeb Ansari
(74) *Attorney, Agent, or Firm* — Lee & Hayes, P.C.

(57) ABSTRACT

In one embodiment, a device obtains information regarding temporary routing patches applied to a network. Each temporary routing patch implements a routing change in the network for a specified amount of time to avoid or mitigate against a service level agreement violation. The device evaluates, using the information regarding the temporary routing patches applied to the network, a plurality of replay scenarios for the network. The device determines, based on the plurality of replay scenarios, a long-term configuration change for the network. The device provides an indication of the long-term configuration change for display.

18 Claims, 10 Drawing Sheets

GENERATING LONG-TERM NETWORK CHANGES FROM SLA VIOLATIONS

TECHNICAL FIELD

The present disclosure relates generally to computer networks, and, more particularly, to generating long-term network changes from service level agreement (SLA) violations.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. For instance, modeling the delay, jitter, packet loss, etc. for a network path can be used to predict when that path will violate the SLA of the application and reroute the traffic, in advance. However, triggering a temporary reroute introduces additional overhead from inserting these dynamic policies, which are often done on a fairly frequent basis. Although automation enforces the new path to be used by predicting that the primary path will exhibit SLA violation, the system keeps making changes to the configuration, thus making the task of troubleshooting much challenging for a network operator.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device obtains information regarding temporary routing patches applied to a network. Each temporary routing patch implements a routing change in the network for a specified amount of time to avoid or mitigate against a service level agreement violation. The device evaluates, using the information regarding the temporary routing patches applied to the network, a plurality of replay scenarios for the network. The device determines, based on the plurality of replay scenarios, a long-term configuration change for the network. The device provides an indication of the long-term configuration change for display.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
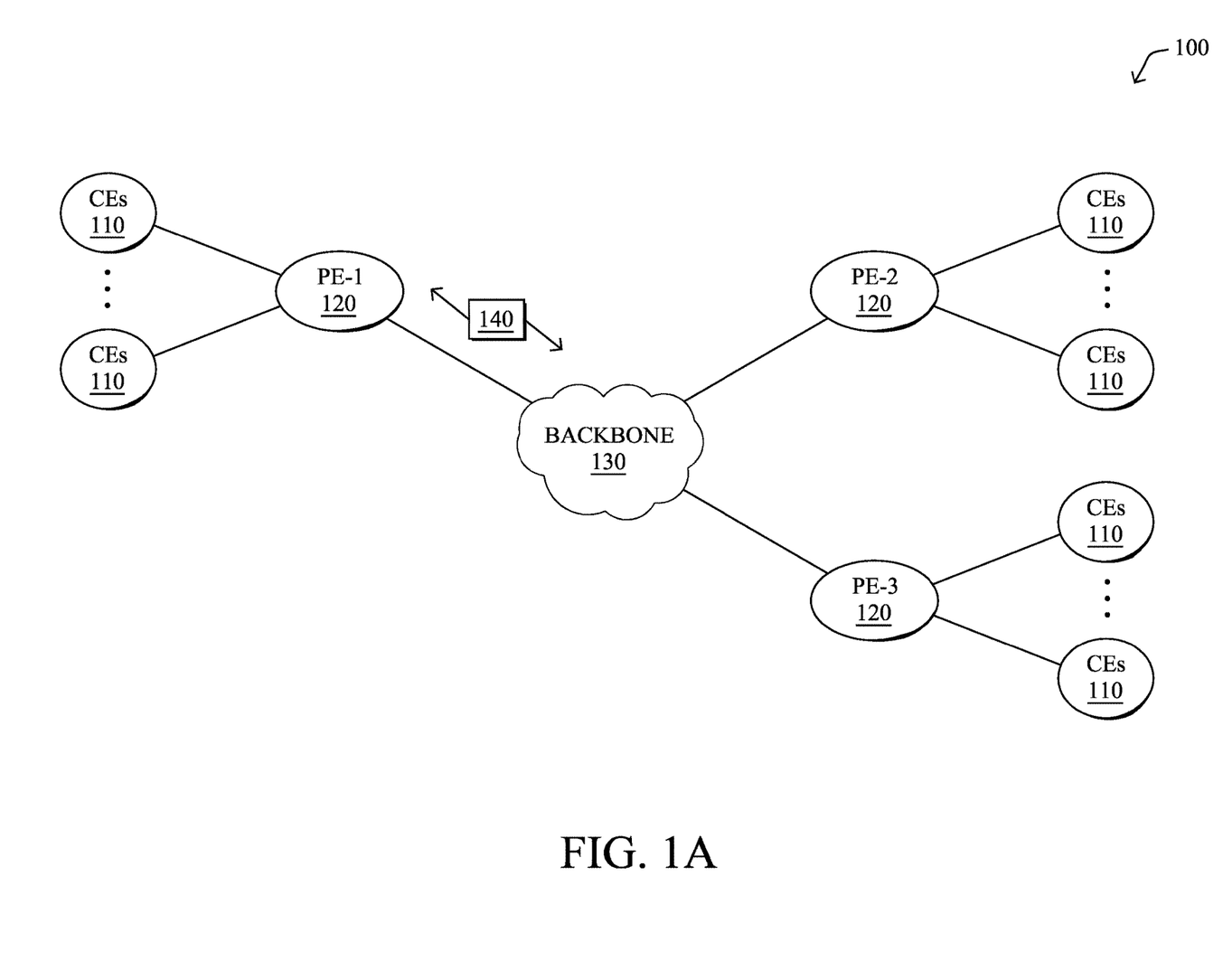
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
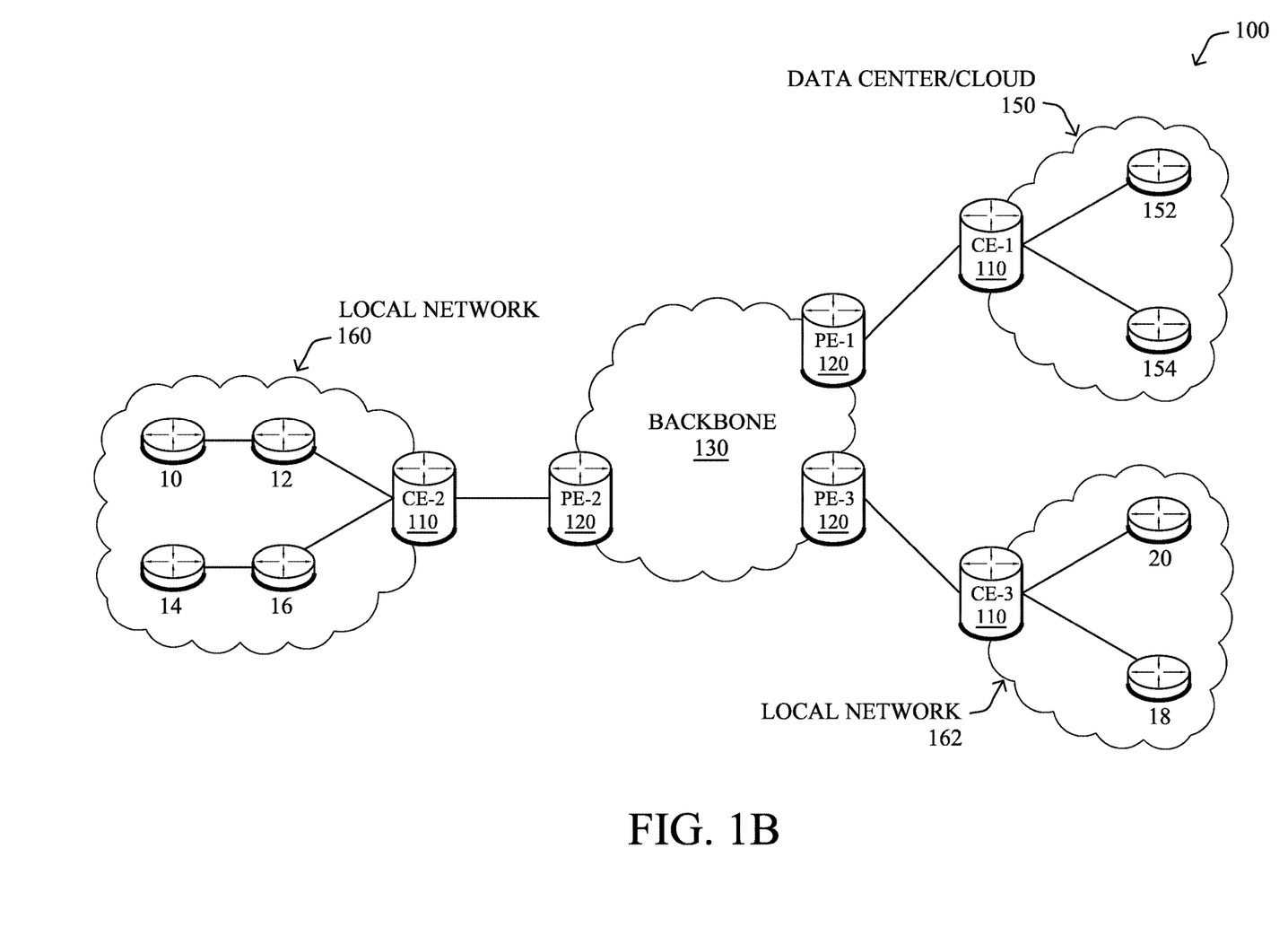

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
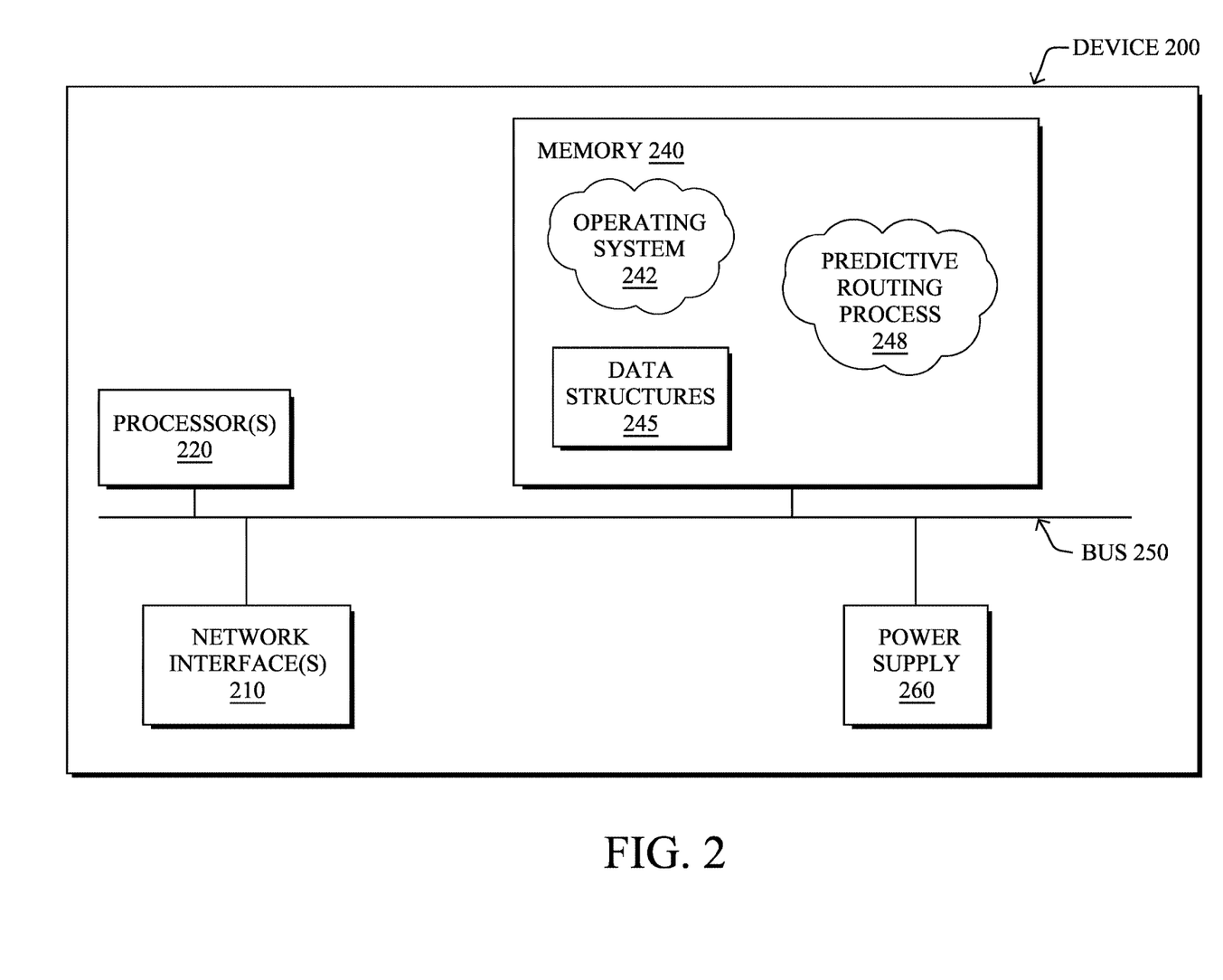
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 may include computer executable instructions that, when executed by processor(s) 220, cause device 200 to perform the techniques described herein. To do so, in some embodiments, predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
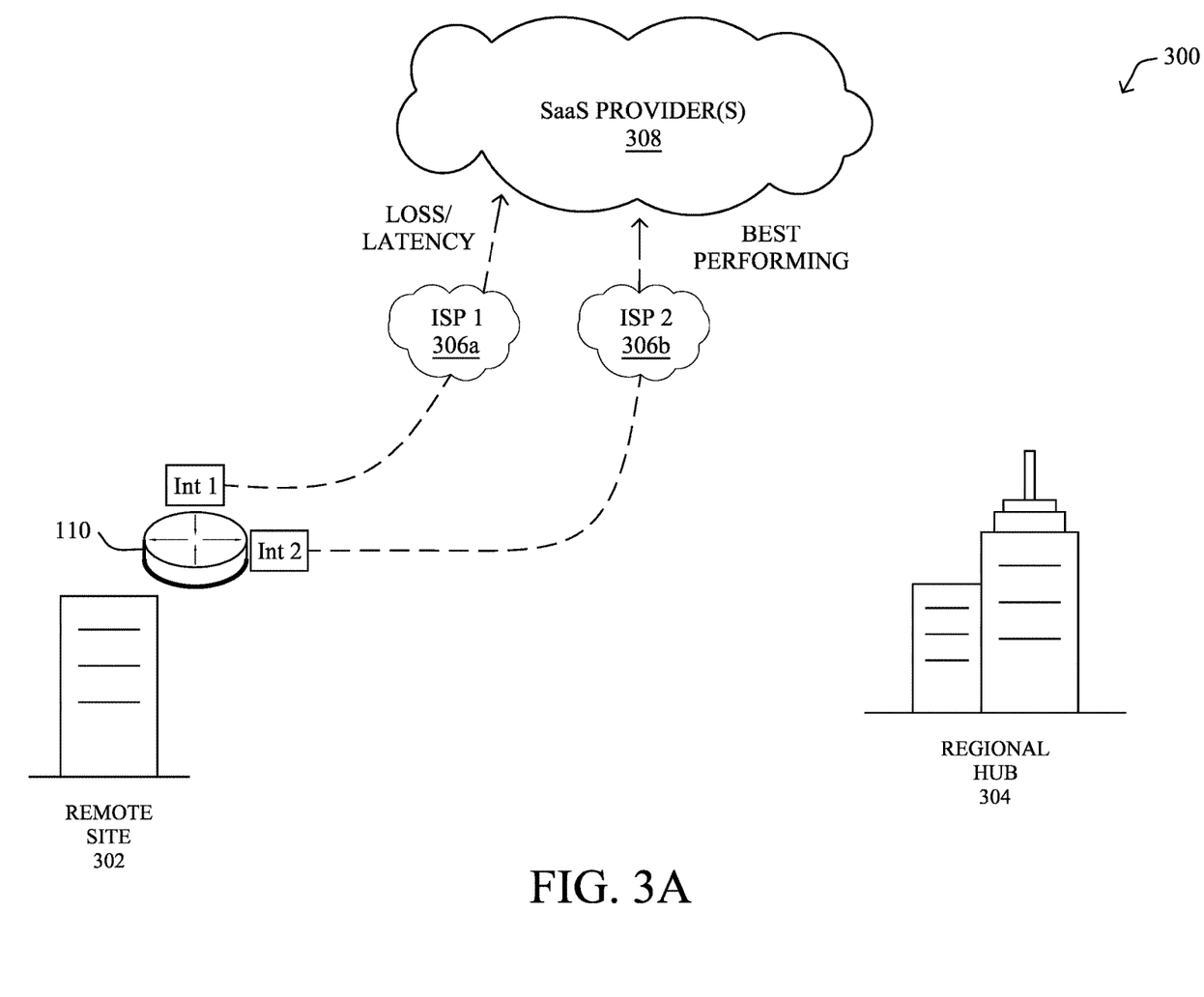
FIGS. 3A-3B illustrate example network deployments.
Figure 3B:
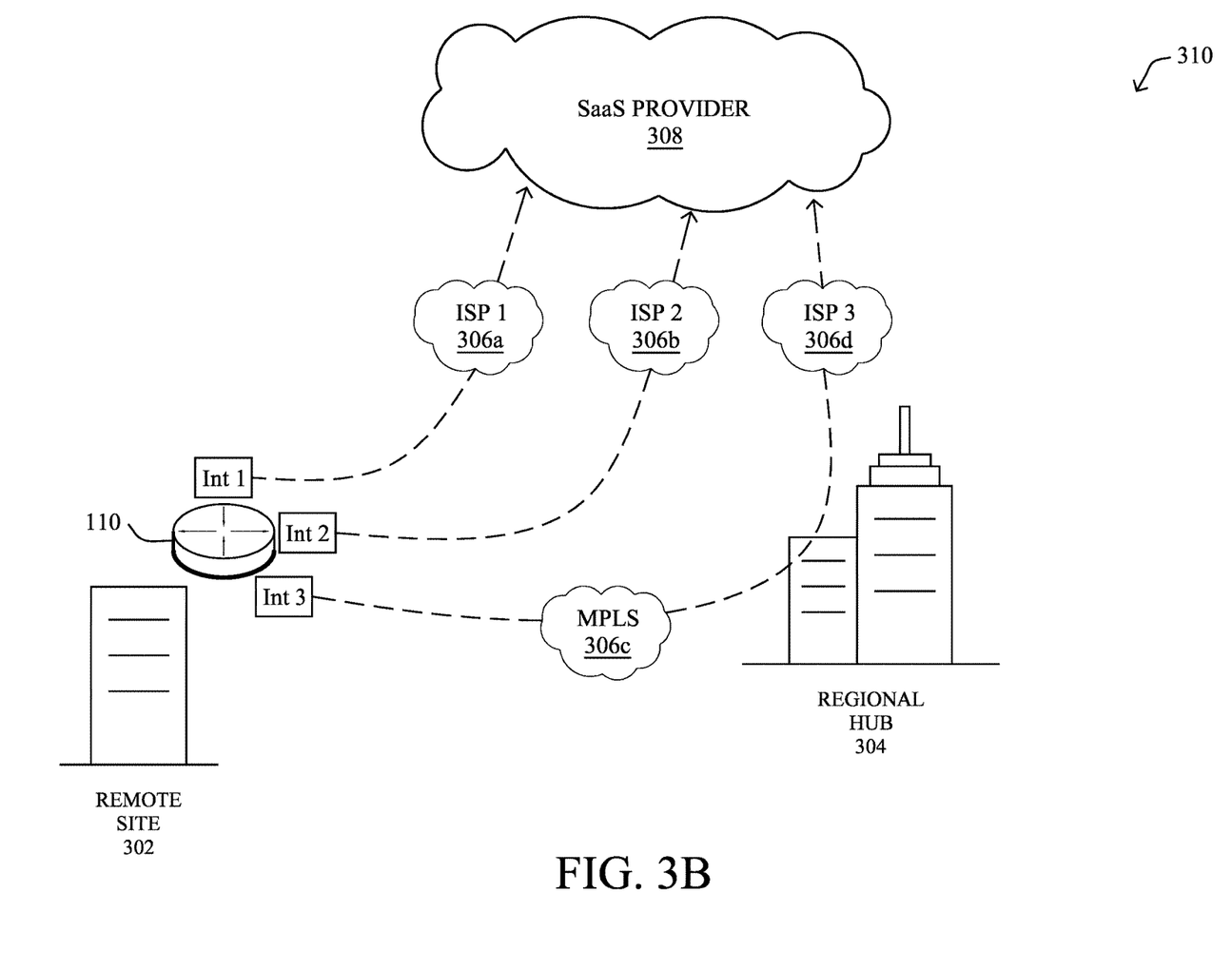

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
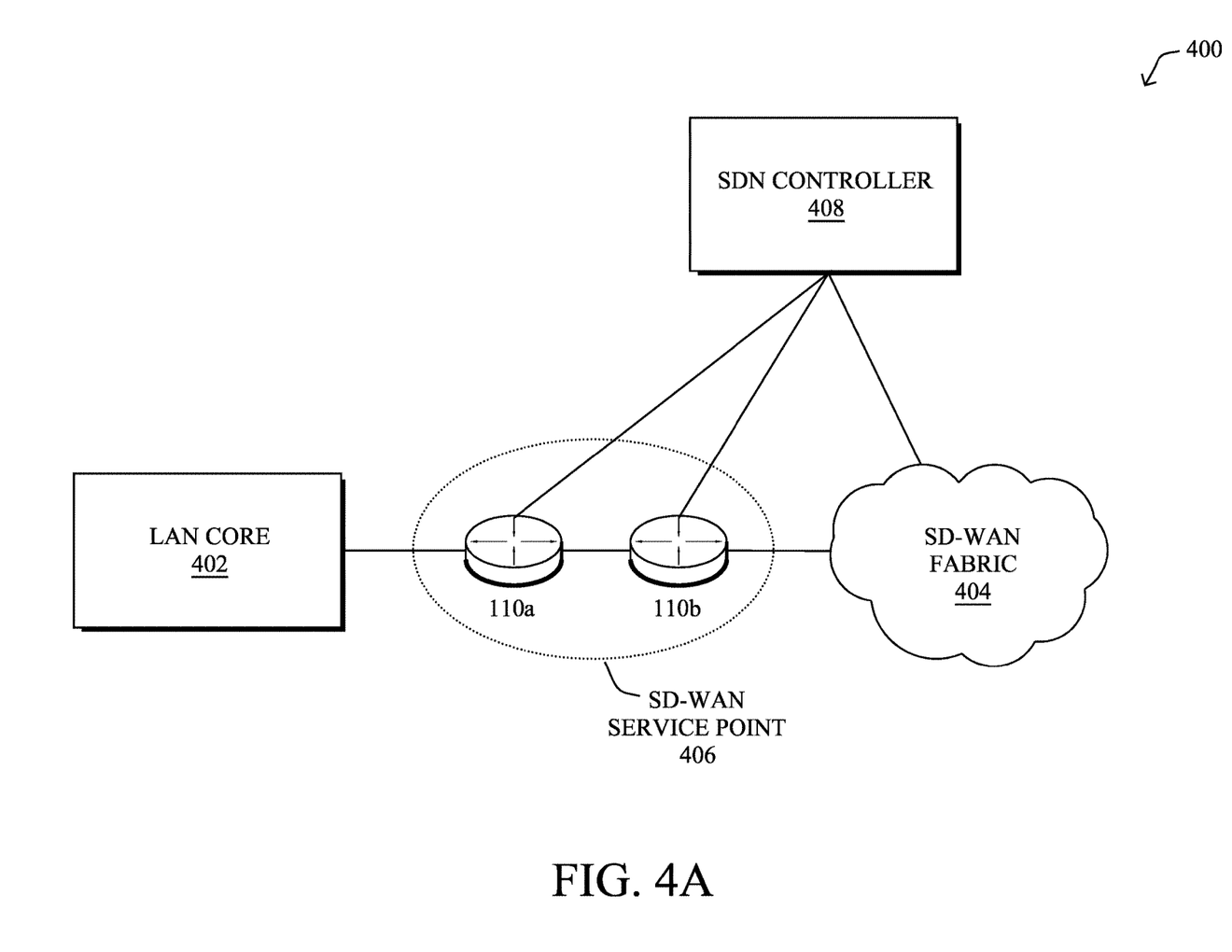
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance. SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast pith the notion of an informed decision, SLA failures are very common in the Internet and a good proportion of them could be avoided (e.g., using an alternate path), if predicted in advance.

Figure 4B:
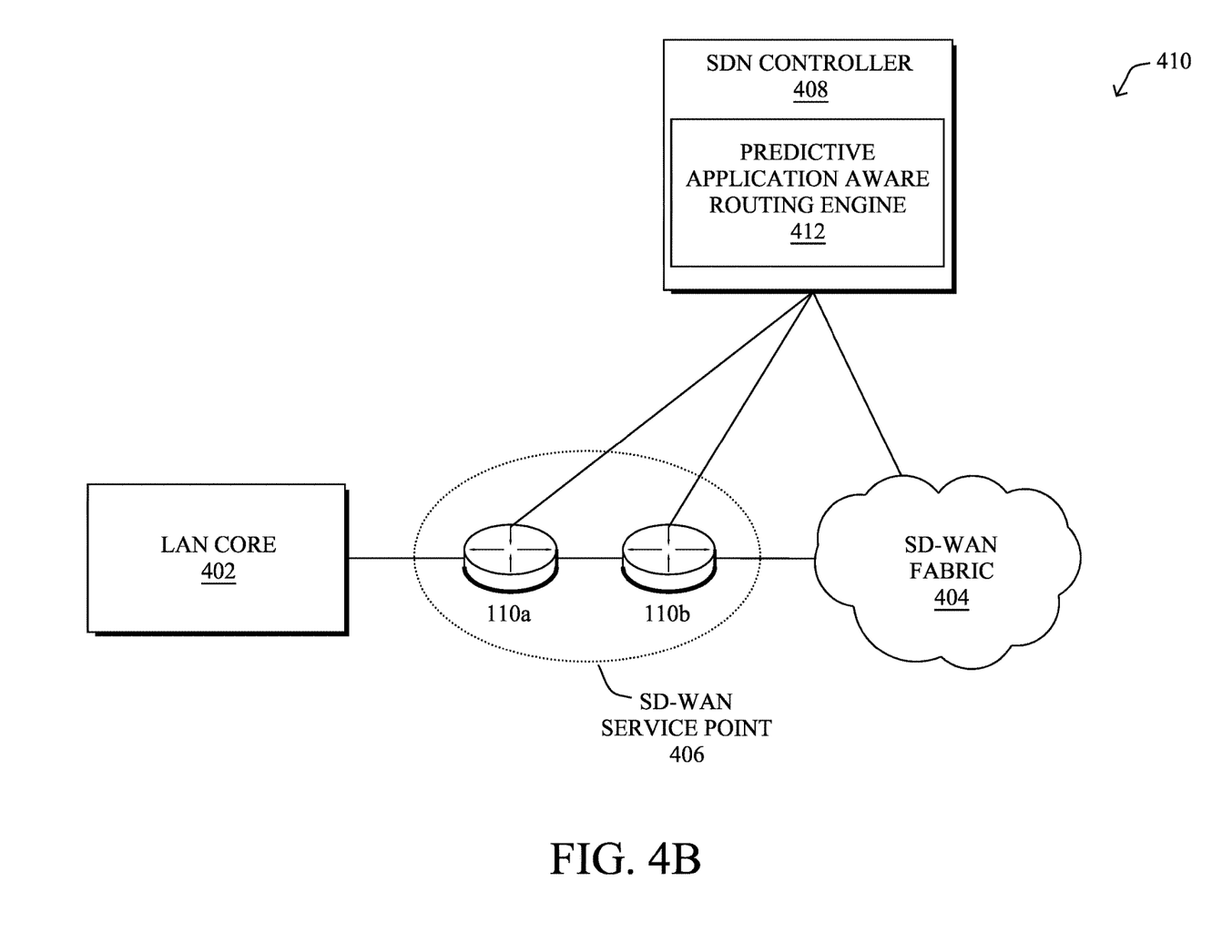

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, both reactive and predictive routing systems are devised to provide temporary mitigation to a recent or imminent problem, respectively. These systems, however, fail to deliver focused, long-term recommended configuration changes to the network. In contrast to temporary changes, such as routing patches that typically, have an expiration period, a long-term configuration change may not have an expiration time and viewed as more permanent or semi-permanent than the changes typically made by a reactive or proactive routing system.

Sometimes, such long-term recommendations may even reveal underlying network topology issues. Temporary reroutes triggered by a predictive routing engine also introduce the overhead of inserting dynamic policies, frequently. Although automation enforces the new path to be used by predicting that the primary path will exhibit an SLA violation, the system keeps will continue to make changes to the configuration, thus making the task of troubleshooting much more challenging for the network operator.

By way of example, assume that predictive application aware routing engine 412 consistently selects a certain path as the most suitable alternative between a pair of nodes. In this case, a long-term remediation could be to set that path as the default choice for this pair of paths. Another example of such long-term changes would be when a network operator has not configured the network properly such as setting Application-Aware Routing (AAR) timer values too large (thus underreacting) or too small (thus overreacting). Finally, the system could also notify the user when no alternate exists at all, thus suggesting the addition of some new connectivity, such as a suitable ISP or transport type, with the objective of providing long-term fixes and avoiding recurring temporary fixes.

—Generating Long-Term Network Changes from SLA Violations—

The techniques herein introduce a system whereby rerouting patches may be aggregated and analyzed over various timescales, to identify singular persisting issues in the network and provide long-term configuration suggestions that address these issues.

Illustratively, the techniques described herein may be performed by hardware, software, and/or firmware, such as in accordance with predictive routing process 248, which may include computer executable instructions executed by the processor 220 (or independent processor of interfaces 210) to perform functions relating to the techniques described herein.

Specifically, according to various embodiments, a device obtains information regarding temporary routing patches applied to a network. Each temporary routing patch implements a routing change in the network for a specified amount of time to avoid or mitigate against a service level agreement violation. The device evaluates, using the information regarding the temporary routing patches applied to the network, a plurality of replay scenarios for the network. The device determines, based on the plurality of replay scenarios, a long-term configuration change for the network. The device provides an indication of the long-term configuration change for display.

Figure 5:
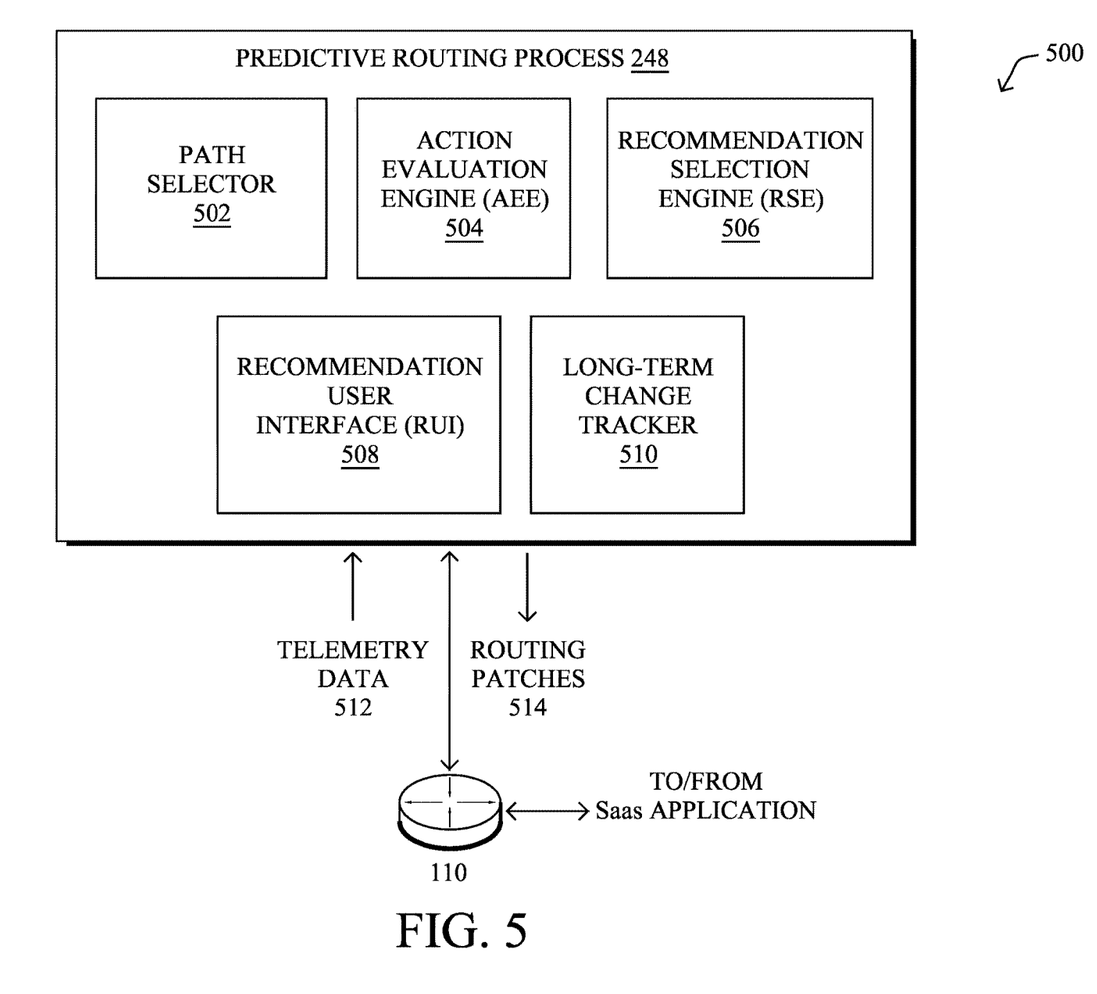
FIG. 5 illustrates an example architecture for generating long-term network changes based on temporary routing patches.

Operationally, FIG. 5 illustrates an example architecture 500 for generating long-term network changes, according to various embodiments. At the core of architecture 500 is predictive routing process 248, which may be executed by a controller for a network or another device in communication therewith. For instance, predictive routing process 248 may be executed by a controller for a network (e.g., SDN controller 408 in FIGS. 4A-4B), a particular networking device in the network (e.g., a router, etc.), another device or service in communication therewith, or the like, to provide a supervisory service to the network.

As shown, predictive routing process 248 may include any or all of the following components: a path selector 502, an action evaluation engine (AEE) 504, a recommendation selection engine (RSE) 506, a recommendation user interface 508, and/or a long-term change tracker 510. As would be appreciated, the functionalities of these components may be combined or omitted, as desired. In addition, these components may be implemented on a singular device or in a distributed manner, in which case the combination of executing devices can be viewed as their own singular device for purposes of executing predictive routing process 248.

As shown, path selector 502 may be responsible for computing rerouting patches, based on telemetry collected from the network. For instance, based on telemetry data 512 collected from router 110, path selector 502 may generate routing patches 514 for router 110, to avoid or mitigate against SLA violations. Telemetry data 512 may be collected in-band, via probing, or other collection mechanisms. In some embodiments, path selector 502 may generate a routing patch in a reactionary manner (i.e., after an SLA is violation is detected), thereby rerouting traffic onto a different path. In further embodiments, path selector 502 may leverage a machine learning-based forecasting model that forecasts SLA violations before they occur. In turn, path selector 502 may generate and push a routing patch, to reroute the traffic onto a different path.

Generally speaking, routing patches 514 calculated by path selector 502 may be temporary in nature and active only for a specified amount of time. For instance, one of patches 514 may instruct router 110 to use path B for the next four hours, instead of its default path A to a particular destination. Thus, for any pair of nodes in the network, path selector 502 may generate the following:

A description of the pair of nodes, which includes all paths connecting the two nodes, with any other relevant information path-specific information, e.g., the interfaces, the ISP, and others, like geographical information of the endpoints if available, etc.

A set of patches, indexed by time T and application class A. Each patch describes the outcome of using a given path $P_{alternate}$ (called the alternate) instead of path $P_{source}$ (called the source) for application A at time T. Each patch contains all the relevant information to determine the impact: what was the total number of sessions that were or could have been saved, what was the performance on the primary and on the alternate, and similar.

Based on the above routing patch information, everything that happened in the network can be determined. From this, the next components of predictive routing process 248 can also determine how the network could be improved in the future.

According to various embodiments, action evaluation engine (AEE) 504 may be configured to use the routing patch information to evaluate different possible scenarios in the network, to see whether any of these scenarios might lead to a performance improvement. AEE 504 may, for instance, be configured to evaluate a series of predefined, actionable scenarios, such as, but not limited to, the following:

Set path P as the new default.
Change the AAR timeout to X.
Add a new transport for the network operator, whose properties are earnt based on data from other networks.

More specifically, AEE 504 may take every scenario and replay historical data with the implemented scenario, monitoring the network and monitoring the outcome in terms of savings. This replay mechanism can be performed in hatch (i.e., periodically running over historical data). Alternatively, the outcome of every scenario can be computed on-the-fly as telemetry is ingested. If the outcome is positive (e.g., results in a reduction in SLA violation time, etc.), AEE 504 may generate a suggestion of the form:

If you [scenario] between [node1] and [node2], then you can save between [min_saving] and [max_saving] session-minutes of application [app] per week.

In some embodiments, AEE 504 may compute the minimum and maximum savings above by running the same scenario that span different time periods, thus giving an indication of the confidence interval. For instance, AEE 504 may rerun the same scenario over different weeks in the past few months, to determine the expected bounds for the savings.

AEE 504 may also recommend an action only if it has determined that such a configuration change has in fact lead to positive changes, where applicable. For example, AEE 504 may verify that path selector 502 switching the active path from being over a primary/default path to being over an alternate path has actually resulted in savings by a threshold amount (e.g., the majority of times over the last n-number of days, etc.). In turn, AEE 504 may collate all such positive routing patches and summarize them for a long-term configuration change suggestion.

In one embodiment, AEE 504 may record the application SLA violation times and path-changes done by path selector 502 and keep track of the possible savings. AEE 504 may then perform a time-consistency check to verify if such problems are always happening between a pair of nodes. This can be done by checking whether the timeseries of probability of SLA violations does not vary too much over primary and alternate paths. Simple statistical measures of spread such as standard-deviation can be used to track this. AEF 504 may then filter only the paths that: a.) are consistent in probability of SLA violation, and b.) see application traffic beyond a threshold. Such paths may then be selected for further action.

Another potential component of predictive routing process 248 may be recommendation selection engine (RSE) 506, which is responsible for ranking and selecting all recommendations made by the AEE 504. Indeed, many long-term configuration change suggestions may lead to marginal benefits and/or deemed undesirable by a network administrator for various reasons (e.g., internal policies, business constraints, etc.) RSE 506 may learn from the user whether a given recommendation is applicable or undesirable, in some embodiments. For instance, some customers have policies not to set LTE paths as the default, due to cost considerations. Based on what the administrator opts to do with the recommendations, RSE 506 may learn not to select certain types of configuration changes for recommendation to them.

Another key capability of RSE 506 may be to group recommendations by site, VPNs, etc. Indeed, administrators typically want to keep their configurations homogeneous and would rather not adjust the configurations on a per endpoint-pair basis. Instead, they want to make changes for a range of site and/or a given VPN. To this end, RSE 506 may aggregate similar recommendations and compute the corresponding statistics (min/max savings, etc.) to present the user in a way that is more actionable. It may do the same for recommendations to add a new transport in a given city or country, as it might become more actionable for the user.

A further potential component of predictive routing process 248 may be recommendation user interface (RUE) 508, whose role is to serve the user with the long-term configuration change recommendations selected by RSE 506. The user can filter and sort long-term recommendations in various ways. For instance, they may be interested in ranking long-term recommendations by savings or to filter those by site, country, application, or the like. One key capabilities of RUI 508 is to allow the user to provide feedback, either by accepting recommendations, similar to a 'like' feature in social network, or by declining them, similar to a 'dislike.' In turn, this information can be used by RSE 506 to improve the selection in the future.

Predictive routing process 248 may also include a long-term change tracker 510 that tracks the performance of any temporary configuration changes that have been converted into long-term changes. Indeed, such changes have been made long-term because of temporary conditions in the network.

Figure 6:
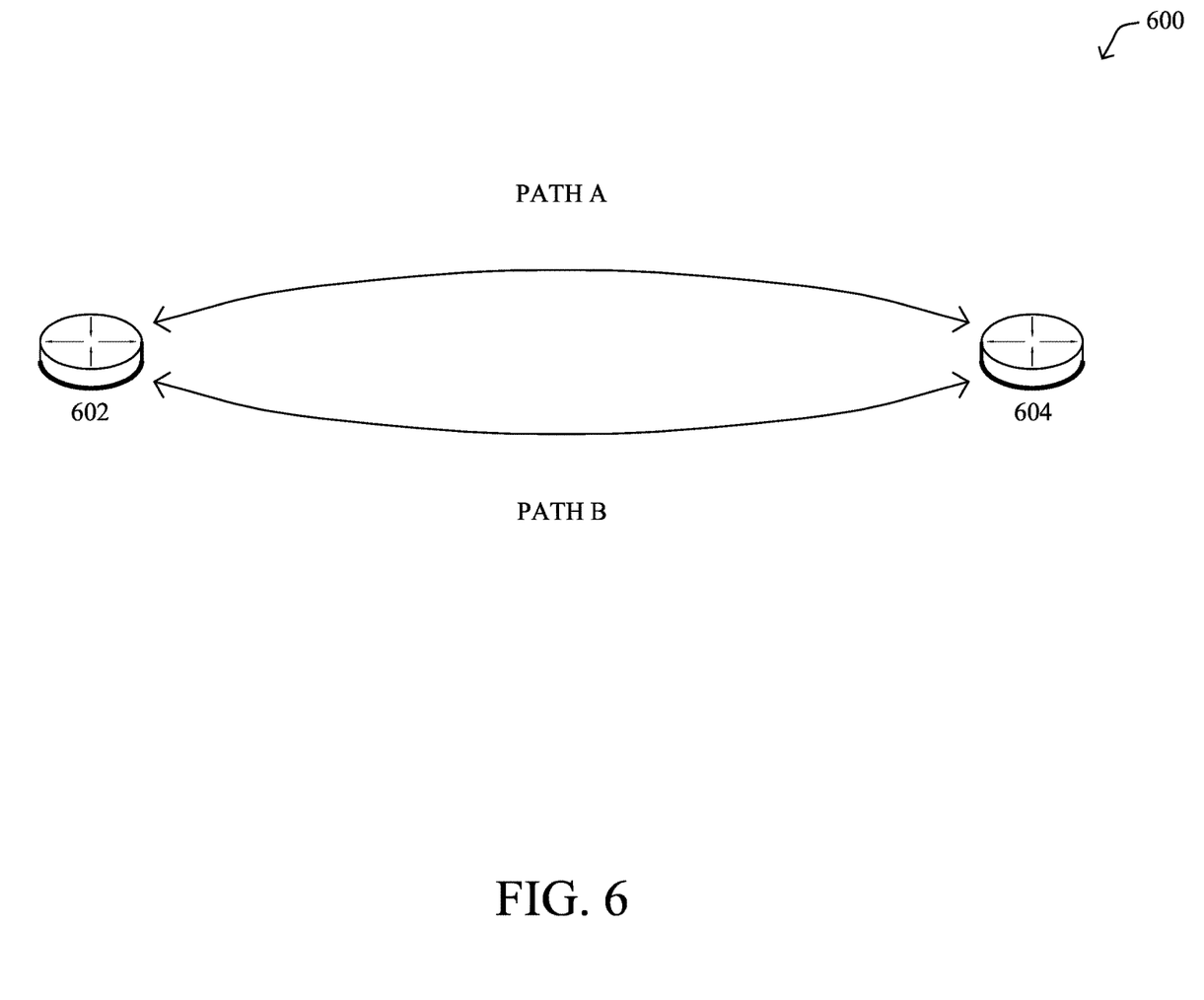
FIG. 6 illustrates an example of different paths available between two points in a network.

For instance, consider example 600 shown in FIG. 6 in which there are multiple paths between node 602 and node 604: a default path A and an alternate path B. For instance, path A may be a MPLS tunnel, while path B is an Internet-based path. If path selector 502 continues to recommend the use of path B over that of path A, predictive routing process 248 may recommend that path B be made the default path between nodes 602, 604. However, at some point, the issues along path A may end up being fixed. Accordingly, for a defined amount of time, long-term change tracker 510 may continue to monitor the long-term change to make path B the default path, to see whether this decision should be reverted. Alternatively, long-term change tracker 510 may wait until another long-term change is made before reverting of the first default configuration.

Figure 7:
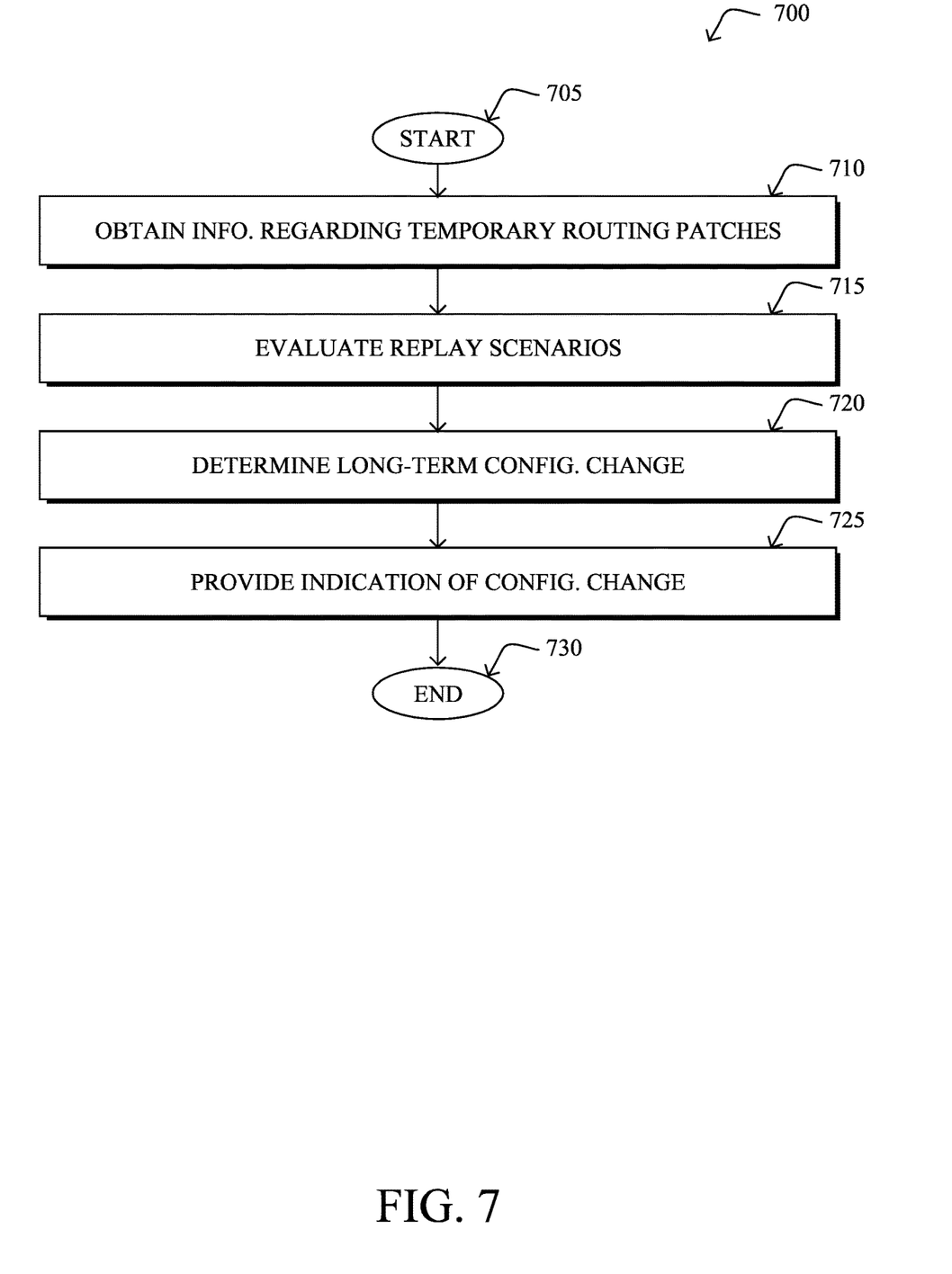
FIG. 7 illustrates an example simplified procedure for generating long-term network changes.

FIG. 7 illustrates an example simplified procedure 700 (e.g., a method) for generating long-term network changes, in accordance with one or more embodiments described herein. For example, a non-generic, specifically configured device (e.g., device 200), such as controller for a network (e.g., an SDN controller or other device in communication therewith), may perform procedure 700 by executing stored instructions (e.g., predictive routing process 248), to provide a supervisory service to a network. The procedure 700 may start at step 705, and continues to step 710, where, as described in greater detail above, the device may obtain information regarding temporary routing patches applied to a network. In various embodiments, each temporary routing patch is implements a routing change in the network for a specified amount of time to avoid or mitigate against a service level agreement (SLA) violation. Such routing patches may be applied reactively (e.g., in response to a detected violation) and/or proactive (e.g., prior to a predicted violation). In some embodiments, any given patch may also be application specific and apply to traffic associated with a particular software as a service (SaaS) application.

At step 715, as detailed above, the device may evaluate, using the information regarding the temporary routing patches applied to the network, a plurality of replay scenarios for the network. To do so, the device may use historical information from the network to evaluate different scenarios and their potential savings in terms of SLA violation times, etc. The different scenarios may assess how the network may react to possible changes to the long-term network configuration, such as by making a certain path a default routing path, changing a timeout value (e.g., an AAR timeout, etc.), adding a new transport mechanism, or the like. In some embodiments, the different scenarios may also assess the effects of such changes over different time periods, to see how the potential changes would perform.

At step 720, the device may determine, based on the plurality of replay scenarios, a long-term configuration change for the network, as described in greater detail above. Indeed, if a particular configuration change would result in a projected amount of savings, the device may determine that that change should be made into a long-term change. In some cases, the device may assess a plurality of configuration changes and select the change from among them, based on their projected effects on the performance of the network.

At step 725, as detailed above, the device may provide an indication of the long-term configuration change for display. For instance, the device may suggest to a network administrator that a certain routing path should be made the default routing path for traffic of a particular SaaS application. In some embodiments, the device may also provide an indication of the expected performance improvements, such as a reduction in SLA violation time, in conjunction with the indication of the long-term configuration change. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for long-term configuration changes to be identified and suggested for a network, to improve the application experience delivered by the network. Rather than simply implementing temporary changes, either on a reactionary or predictive basis, the techniques herein are able to simulate the effects of making such changes into permanent/long-term changes, based on the temporary changes made in the network.

While there have been shown and described illustrative embodiments that provide for generating long-term improvement suggestions from historical analysis of SLA violations and temporary changes, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable is medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
obtaining, by a device, information regarding temporary routing patches applied to a network, each temporary routing patch implementing a routing change in which traffic is sent along an alternate path in the network for a specified amount of time to avoid or mitigate against a service level agreement violation predicted to be exhibited by a primary path in the network;
evaluating, by the device and using both historical information from the network and the information regarding the temporary routing patches applied to the network, a plurality of replay scenarios for the network to determine a performance impact associated with using each alternate path in place of the primary path;
determining, by the device and based on the performance impact, that a particular replay scenario resulted in a positive change in network performance exceeding a threshold amount, wherein the particular replay scenario included making a particular alternate path of a particular temporary routing patch a default routing path, and wherein the positive change results in a reduction in service level agreement violation time;
determining, by the device and based on the positive change, a long-term configuration change for the network that makes the particular alternate path the default routing path; and
providing, by the device, an indication of the long-term configuration change for display.

2. The method as in claim 1, wherein one or more of the temporary routing patches are for traffic associated with a particular software as a service (SaaS) application.

3. The method as in claim 1, wherein the long-term configuration change does not have a specified end time.

4. The method as in claim 1, wherein the long-term configuration change is a change to a configured timeout value.

5. The method as in claim 1, wherein the long-term configuration change corresponds to a new service provider or transport type.

6. The method as in claim 1, wherein the plurality of replay scenarios span different time periods for the network.

7. The method as in claim 1, further comprising:
selecting the long-term configuration change for the network based on a computed reduction in service level agreement violation time.

8. The method as in claim 1, wherein the indication of the long-term configuration change provided for display comprises a suggestion that the alternate path should be made the default routing path.

9. The method as in claim 1, further comprising:
grouping the long-term configuration change with one or more other long-term configuration change for a particular location in the network or for a particular virtual private network (VPN).

10. An apparatus, comprising:
one or more network interfaces;
a processor coupled to the one or more network interfaces and configured to execute one or more processes; and
a memory configured to store a process that is executable by the processor, the process when executed configured to:
obtain information regarding temporary routing patches applied to a network, each temporary routing patch implementing a routing change in which traffic is sent along an alternate path in the network for a specified amount of time to avoid or mitigate against a service level agreement violation predicted to be exhibited by a primary path in the network;
evaluate, using both historical information from the network and the information regarding the temporary routing patches applied to the network, a plurality of replay scenarios for the network to determine a performance impact associated with using each alternate path in place of the primary path;
determine, based on the performance impact, that a particular replay scenario resulted in a positive change in network performance exceeding a threshold amount, wherein the particular replay scenario included making a particular alternate path of a particular temporary routing patch a default routing path, and wherein the positive change results in a reduction in service level agreement violation time;
determine, based on the positive change, a long-term configuration change for the network that makes the particular alternate path the default routing path; and
provide an indication of the long-term configuration change for display.

11. The apparatus as in claim 10, wherein one or more of the temporary routing patches are for traffic associated with a particular software as a service (SaaS) application.

12. The apparatus as in claim 10, wherein the long-term configuration change does not have a specified end time.

13. The apparatus as in claim 10, wherein the long-term configuration change is a change to a configured timeout value.

14. The apparatus as in claim 10, wherein the long-term configuration change corresponds to a new service provider or transport type.

15. The apparatus as in claim 10, wherein the plurality of replay scenarios span different time periods for the network.

16. The apparatus as in claim 10, wherein the process when executed is further configured to:
select the long-term configuration change for the network based on a computed reduction in service level agreement violation time.

17. The apparatus as in claim 16, wherein the process when executed is further configured to:
provide the computed reduction in service level agreement violation time for display in conjunction with the indication of the long-term configuration change.

18. A tangible, non-transitory, computer-readable medium storing program instructions that cause a device to execute a process comprising:
- obtaining, by the device, information regarding temporary routing patches applied to a network, each temporary routing patch implementing a routing change in which traffic is sent along an alternate path in the network for a specified amount of time to avoid or mitigate against a service level agreement violation predicted to be exhibited by a primary path in the network;
- evaluating, by the device and using both historical information from the network and the information regarding the temporary routing patches applied to the network, a plurality of replay scenarios for the network to determine a performance impact associated with using each alternate path in place of the primary path;
- determining, by the device and based on the performance impact, that a particular replay scenario resulted in a positive change in network performance exceeding a threshold amount, wherein the particular replay scenario included making a particular alternate path of a particular temporary routing patch a default routing path, and wherein the positive change results in a reduction in service level agreement violation time;
- determining, by the device and based on the positive change, a long-term configuration change for the network that makes the particular alternate path the default routing path; and
- providing, by the device, an indication of the long-term configuration change for display.

* * * * *